(12) United States Patent
Eppert et al.

(10) Patent No.: US 6,799,806 B2
(45) Date of Patent: Oct. 5, 2004

(54) FITTING FOR A VEHICLE SEAT

(75) Inventors: Dietmar Eppert, Remscheid (DE); Martin Stilleke, Recklinghausen (DE); Ulrich Lehmann, Alfter-Bonn (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/303,553

(22) Filed: Nov. 25, 2002

(65) Prior Publication Data

US 2003/0067205 A1 Apr. 10, 2003

Related U.S. Application Data

(63) Continuation of application No. PCT/EP02/01032, filed on Feb. 1, 2002.

(30) Foreign Application Priority Data

Feb. 6, 2001 (DE) .......................... 101 05 282

(51) Int. Cl.[7] .............................................. A47B 97/00
(52) U.S. Cl. .................................................. 297/463.1
(58) Field of Search ................................. 297/362, 366, 297/367, 374, 463.1, 463.2; 403/52, 84, 270

(56) References Cited

U.S. PATENT DOCUMENTS

| 4,736,986 A | * | 4/1988 | Kato et al. ................... 297/367 |
| 5,681,086 A | | 10/1997 | Baloche |
| 6,296,311 B1 | * | 10/2001 | Bonk et al. .................. 297/367 |
| 6,328,383 B2 | * | 12/2001 | Rohee et al. ................. 297/367 |

FOREIGN PATENT DOCUMENTS

| EP | 0 720 930 A1 | 7/1996 |
| GB | 1060992 A | 3/1967 |
| GB | 1193971 A | 6/1970 |

* cited by examiner

Primary Examiner—Milton Nelson, Jr.
(74) Attorney, Agent, or Firm—Alston & Bird LLP

(57) ABSTRACT

In the case of a fitting (5) for a vehicle seat, in particular for a motor vehicle seat, having a first fitting part (11), having a second fitting part (12) which can be rotated relative to the first fitting part (11) and can be locked, and having a ring (35) which holds the two fitting parts (11, 12) together in the axial direction, the first fitting part (11) is pressed into the ring (35).

15 Claims, 1 Drawing Sheet

FITTING FOR A VEHICLE SEAT

CROSS-REFERENCE TO RELATED APPLICATION

This application is a continuation of PCT/EP02/01032, which designates the US, was filed Feb. 1, 2002, was published in German on Aug. 15, 2002, and is entirely incorporated herein by reference.

BACKGROUND OF THE INVENTION

The invention relates to a fitting for a vehicle seat, in particular for a motor vehicle seat.

EP 0 720 930 A1 discloses a known fitting which is provided as an inclination adjuster for the backrest of a vehicle seat. A ring which sits radially on the outside and whose edges are bent radially inwards engages around the two fitting parts. However, this fitting could also be used as an adjuster for different parts of the vehicle seat. For such intended uses, simplified and more cost-effective production would be desirable.

BRIEF SUMMARY OF THE INVENTION

One aspect of the present invention is the provision of an improved fitting for a vehicle seat, in particular for a motor vehicle seat. In accordance with one aspect of the present invention, such a fitting includes a first fitting part, a second fitting part which can be rotated relative to the first fitting part, and a ring which holds the two fitting parts together in the axial direction, wherein the first fitting part is pressed into (e.g., press-fit into) the ring.

By virtue of the fact that the first fitting part is pressed into the ring, as a rule in the axial direction, the production of the fitting is simplified and the cost reduced, since the formation of the edge in the ring is omitted, at least on one side. The ring is therefore preferably arranged radially on the outside and encloses both the first fitting part and the second fitting part in the circumferential direction. The pressing-in enables the fitting to be preassembled (e.g., partially assembled) without a welding process, since the ring fixes the entire fitting in place. In this stage, functional testing, for example, can take place. The retaining function is integrated in the ring, with the result that there is a reduction in weight owing to the omission of retaining plates. A 360° pivoting range means that universal use is possible. With the same structural-space requirement, the solution according to the invention can be used for a latching fitting, for a tumbling fitting (geared fitting) or for a prefolding mechanism.

It is advantageous if the ring has, radially inwards, a step (e.g., shoulder), with the first fitting part pressed in as far as the step. The first fitting part preferably has a larger diameter in the radial direction than the second fitting part. This step enables the axial play of the fitting to be adjusted. At the same time, the step, which acts as a sealing step, prevents the ingress of welding spray during the final installation of the fitting.

Adapters which are coordinated with the use are preferably provided for the final installation and are used to fasten the fitting to the structure of the vehicle seat. The adapter assigned to the first fitting part may be formed as a single piece with the ring. However, it is also advantageous if the first fitting part, the ring and the adapter are connected to one another by a common connection, for example a single, common weld seam or common connecting elements, i.e., for example, the three components are connected by a laser weld seam. This leads to a secure connection with minimal use of connecting means.

In the case of a welding connection, laser welding is preferred, since the weld seam can then be applied in a targeted manner and without accessories. The laser welding preferably takes place from the same direction as the attachment of the respective adapter, i.e., as a rule, through the latter. Instead of the use of an adapter, for example instead of the adapter which is assigned to the second fitting part, it is also possible to attach the fitting part concerned directly to the structure.

BRIEF DESCRIPTION OF THE DRAWINGS

The invention is explained in greater detail below with reference to an exemplary embodiment illustrated in the drawings, in which.

DETAILED DESCRIPTION OF THE INVENTION

Figure 1:
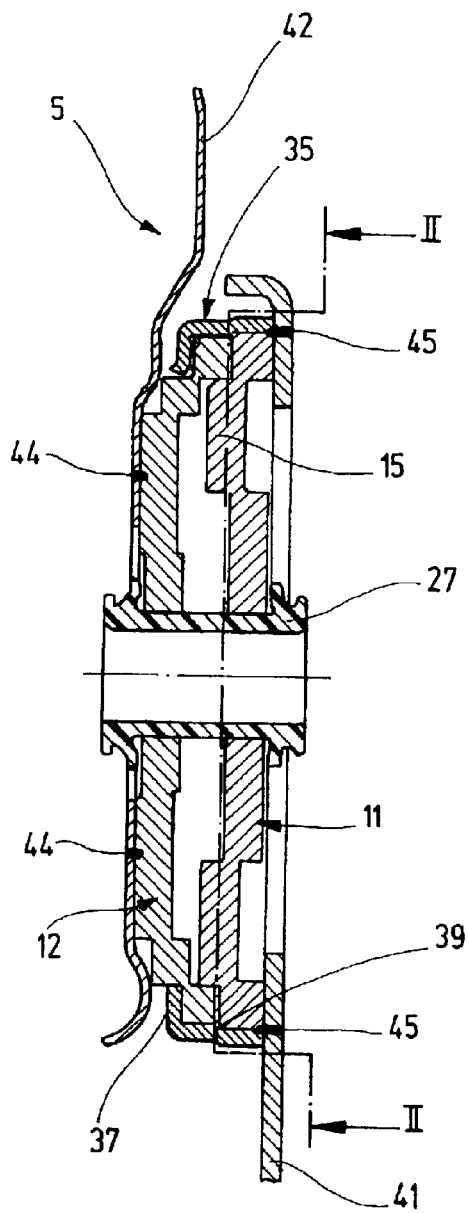
FIG. 1 shows a section through the exemplary embodiment.
Figure 2:
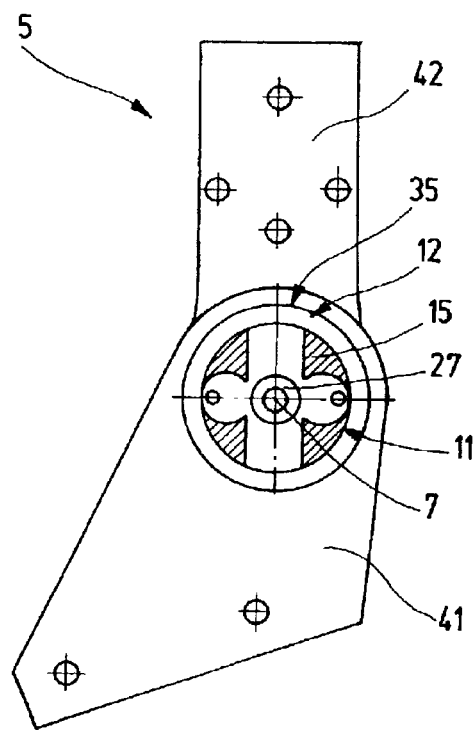
FIG. 2 shows a section along the line II—II in FIG. 1.
Figure 3:
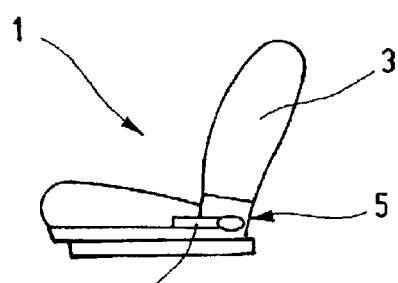
FIG. 3 shows a vehicle seat provided with the exemplary embodiment.

For adjusting the inclination of its backrest 3, a vehicle seat 1 for a motor vehicle has, on both of its sides, a respective fitting 5 which is designed as a latching fitting, but could also be designed as a tumbling fitting. The two fittings 5 are in a geared connection to each other by means of a transmission rod. A hand lever 9, which sits in a rotationally fixed manner on the transmission rod, is used for the manual actuation of the fittings 5. The following directional details refer to the cylindrical coordinate system which is defined by the transmission rod arranged horizontally and transversely to the direction of travel.

Each fitting 5 has, as a first fitting part, an approximately disc-shaped fitting lower part 11 and, as a second fitting part, a likewise approximately disc-shaped fitting upper part 12. Four guide and bearing segments 15 of approximately quarter-circle-shaped profile are integrally formed on the fitting lower part 11 which is subsequently fixed on the seat part. The circumferential surfaces of the guide and bearing segments 15, which surfaces point radially outwards and are curved around the centre of the fitting lower part 11, together form a cylindrically shaped bearing surface, with four interruptions, for a correspondingly curved, radially inwardly pointing bearing surface of the fitting upper part 12, which is designed as a hollow wheel and is subsequently fixed on the backrest. As a result, in an unlocked state the fitting upper part 12 can be rotated relative to the fitting lower part 11, specifically through 360°, before being fitted into the vehicle seat 1.

Every two guide and bearing segments 15 furthermore form a guide which runs in the radial direction for a tooth segment which is arranged in a radially moveable manner and, for the locking of the fitting 5, interacts with the bearing surface of the fitting upper part, which surface is also provided for the mounting. An eccentric (not illustrated in detail) which serves for the movement of the two tooth segments is seated in a rotationally fixed manner on a plastic transmission element 27 which, in turn, is seated in a rotationally fixed manner on the transmission rod. With two flanges on the end side, the transmission element 27 serves as an axial securing means for axially keeping the components of the fitting 5 together during assembly and, if appropriate, before final installation.

A clamping ring 35 is seated on the radially outwardly pointing circumferential surface of the fitting lower part 11 and fitting upper part 12. On its end side which faces away from the fitting lower part 11, the clamping ring 35 has a flanged edge 37 (e.g., shoulder) which secures the fitting upper part 12 in the axial direction. In the radial direction, a certain amount of play is provided between the fitting upper part 12 and the clamping ring 35, in order to enable unhindered rotational movement of the fitting upper part 12. The fitting upper part 11 has a somewhat larger outer radius than the fitting upper part 12, i.e. the fitting upper part 11 protrudes somewhat in the radial direction over the fitting upper part 12. A corresponding, annular sealing step 39 in the form of a shoulder is provided on the clamping ring 35, on its inner circumferential surface in the transition region between the two fitting parts 11 and 12. The inner radius of the clamping ring 35, before assembly, is not larger in the region of the fitting lower part 11, with the selected tolerances, than the outer radius of the fitting lower part 11.

During assembly of the fitting 5, after insertion of the abovementioned components required for the locking means between the fitting lower part 11 and fitting upper part 12, as one of the last process steps the clamping ring 35 is pushed over the fitting upper part 12 and the fitting lower part 11 is pressed into the clamping ring 35 in the axial direction as far as the sealing step 39, which acts as an axial stop, thereby producing a fixed connection (e.g., a press-fit connection). The fitting 5 can then be transported without damage. However, for its subsequent use a lower adapter 41, which is matched to the intended purpose, and an upper adapter 42, which is matched to the intended purpose, are preferably already attached to the fitting 5. The upper adapter 42 is fastened to the fitting upper part 12 by laser weld connections 44 on the end side facing away from the fitting lower part 11 in the axial direction. The lower adapter 41 is placed in the axial direction onto the fitting lower part 11, on the side facing away from the fitting upper part 12. An annular laser weld seam 45 for connecting purposes is applied from the same direction through the material of the lower adapter 41 along the outer radius of the fitting lower part 11, i.e. is guided at the same time along the clamping ring 35. As a result, one welding process is used to fixedly connect three components, namely the fitting lower part 11, the clamping ring 35 and the lower adapter 41.

That which is claimed:

1. A fitting for a vehicle seat, comprising:
   a first fitting part that is press-fit into a ring which holds the first fitting part and a second fitting part together in an axial direction such that the second fitting part can be rotated about an axis relative to the first fitting part, wherein the axis extends in the axial direction; and
   an adapter connected fixedly to the first fitting part,
   wherein:
   the adapter is for fastening the fitting to structure of the vehicle seat, and
   the first fitting part, the ring and the adapter are all connected to one another by a single, common weld seam.

2. A fitting according to claim 1, wherein the weld seam is a laser weld seam applied from a side of the fitting which faces away from the second fitting part.

3. A fitting according to claim 1, wherein the fitting is in combination with the vehicle seat, the vehicle seat includes a backrest, and the fitting is mounted for adjusting an inclination of the backrest.

4. A fitting according to claim 1, wherein the ring encloses radially outer portions of both the first fitting part and the second fitting part in a circumferential direction.

5. A fitting according to claim 4, wherein the ring includes first and second shoulders which each extend radially inward, the first fitting part is press-fit into the ring so that a circumferential portion of the first fitting part is adjacent the first shoulder, and the second fitting part is positioned between the first fitting part and the second shoulder such that the first fitting part and the second shoulder restrict movement of the second fitting part in the axial direction.

6. A fitting according to claim 4, wherein the ring includes a shoulder which extends radially inward, and the first fitting part is press-fit into the ring so that a circumferential portion of the first fitting part is adjacent the shoulder.

7. A fitting according to claim 6, wherein the fitting is in combination with the vehicle seat, the vehicle seat includes a backrest, and the fitting is mounted for adjusting an inclination of the backrest.

8. A fitting according to claim 4, wherein the radially outer portion of the first fitting part has a larger diameter than the radially outer portion of the second fitting part.

9. A fitting according to claim 8, wherein the ring includes a shoulder which extends radially inward, and the first fitting part is press-fit into the ring so that a circumferential portion of the of the first fitting part is adjacent the shoulder.

10. A fitting according to claim 8, wherein the fitting is in combination with the vehicle seat, the vehicle seat includes a backrest, and the fitting is mounted for adjusting an inclination of the backrest.

11. A fitting for a vehicle seat comprising:
    a first fitting part that is press-fit into a ring which holds the first fitting part and a second fitting part together in an axial direction such that the second fitting part can be rotated about an axis relative to the first fitting part, wherein the axis extends in the axial direction; and
    an adapter for fastening the fitting to structure of the vehicle seat,
    wherein the first fitting part, the ring and the adapter are all fixedly connected to one another via a common weld.

12. A fitting according to claim 11, wherein the ring encloses radially outer portions of both the first fitting part and the second fitting part in a circumferential direction.

13. A fitting according to claim 12, wherein the radially outer portion of the first fitting part has a larger diameter than the radially outer portion of the second fitting part.

14. A fitting according to claim 12, wherein the ring includes first and second shoulders which each extend radially inward, the first fitting part is press-fit into the ring so that a circumferential portion of the first fitting part is adjacent the first shoulder, and the second fitting part is positioned between the first fitting part and the second shoulder such that the first fitting part and the second shoulder restrict movement of the second fitting part in the axial direction.

15. A fitting according to claim 14, wherein the fitting is in combination with the vehicle seat, the vehicle seat includes a backrest, and the fitting is mounted for adjusting an inclination of the backrest.

* * * * *